United States Patent
Scruggs et al.

(10) Patent No.: US 12,314,791 B1
(45) Date of Patent: *May 27, 2025

(54) METHOD FOR MAKING ADVANCED METAL CORES FOR METAL CARDS

(71) Applicant: InterActive Cards, Inc., Lakeland, FL (US)

(72) Inventors: Michael Scruggs, Lakeland, FL (US); Lee Shaye Kirkland, Lakeland, FL (US); Jerry Michael West, Lakeland, FL (US)

(73) Assignee: InterActive Cards, Inc., Lakeland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,685

(22) Filed: Mar. 13, 2024

Related U.S. Application Data (63) Continuation of application No. 17/825,500, filed on May 26, 2022, now Pat. No. 11,954,544.

(Continued)

(51) Int. Cl.
*B29C 39/12* (2006.01)
*B05D 1/40* (2006.01)
(Continued)

(52) U.S. Cl.
CPC ............ *G06K 19/022* (2013.01); *B05D 1/40* (2013.01); *B05D 3/007* (2013.01); *B05D 3/0466* (2013.01); *B05D 3/0493* (2013.01); *B05D 3/12* (2013.01); *B05D 7/14* (2013.01); *B29C 39/10* (2013.01); *B29C 39/123* (2013.01); *B29K 2105/02* (2013.01); *B29K 2705/00* (2013.01); *B29L 2009/003* (2013.01)

(58) Field of Classification Search
CPC ....... B29C 39/10; B29C 39/12; B29C 39/123; B29C 39/42; B29K 2705/00; B29K 2105/20; B29L 2009/003; H01H 2231/05; B05D 1/40; B05D 3/0493; B05D 3/0466; B05D 3/12; B05D 7/14; B05D 7/16; B05D 7/50; B05D 2202/00; B05D 2202/15
See application file for complete search history.

(56) References Cited

U.S. PATENT DOCUMENTS

| | | | |
|---|---|---|---|
| 11,954,544 B1 * | 4/2024 | Scruggs | B05D 1/40 |
| 2015/0041546 A1 * | 2/2015 | Herslow | G06K 19/02 |
| | | | 428/338 |

(Continued)

FOREIGN PATENT DOCUMENTS

WO   WO-2023034642 A1 *   3/2023   ....... B29C 45/14647

*Primary Examiner* — William P Fletcher, III
(74) *Attorney, Agent, or Firm* — Nicholas Pfeifer; Smith & Hopen, P.A.

(57) ABSTRACT

An electronic core for a metal card, such as a transaction card, having a metal core and a cured polymer top surface, is manufactured by a process in which a two-part polymer mixture is introduced to a reservoir holding the metal core in a process chamber, and then a partial vacuum followed by pressurization with inert gas are used to reduce the volume of voids in the partially-cured polymer mixture, followed by curing outside of the process chamber, and then the top surface is removed by a treatment operation, such as milling or etching, to form a reduced upper surface with less surface irregularities which is more substantially plan the original top surface.

21 Claims, 12 Drawing Sheets

Related U.S. Application Data

(60) Provisional application No. 63/308,577, filed on Feb. 10, 2022.

(51) Int. Cl.
    *B05D 3/00*     (2006.01)
    *B05D 3/04*     (2006.01)
    *B05D 3/12*     (2006.01)
    *B05D 7/14*     (2006.01)
    *B29C 39/10*     (2006.01)
    *B29K 105/02*     (2006.01)
    *B29K 705/00*     (2006.01)
    *B29L 9/00*     (2006.01)
    *G06K 19/02*     (2006.01)

(56) References Cited

U.S. PATENT DOCUMENTS

2015/0339564 A1* 11/2015 Herslow ................ B32B 15/20
                                                                                                                                          156/60
2019/0073578 A1* 3/2019 Lowe .................... G06K 19/02

* cited by examiner

METHOD FOR MAKING ADVANCED METAL CORES FOR METAL CARDS

CROSS-REFERENCE TO RELATED APPLICATIONS

This nonprovisional application is a continuation of and claims priority to U.S. application Ser. No. 17/825,500, filed May 26, 2022, by the same inventors, which claims priority from U.S. Application. No. 63/308,577, filed Feb. 10, 2022, by the same inventors, the disclosure of which is specifically incorporated by reference herein in its entirety.

BACKGROUND OF THE INVENTION

Field of the Invention

The present invention is in the field of processes for making metal cards and, more particularly, for making metal cores for use in metal cards, especially metal cards useful as payment cards.

Background of the Invention

Metal cards are a relatively recent innovation in the financial transaction card industry. Metal cards have become increasingly popular and have been marketed as a more prestigious variant of the familiar all plastic credit card. Added weight, rigidity, more elegant decoration, and perceived ruggedness have made these cards popular with customers who desire premium quality and service. Metal card manufacturers are constantly trying to improve manufacturing processes. Additionally, metal card manufacturers have a need to apply the latest advances to metal cards. Currently there is a desire to introduce advanced features such as contactless payment capability, biometric authentication, and dynamic secret codes to metal cards.

Metal cards are available in at least two varieties: metal surface cards and embedded metal cards.

Metal surface cards have a metal surface that can be decorated in all the ways and methods that any metal product can be decorated, such as by machining, hammering, laser etching, chemical etching, and embossing, to name just a few. The metal can be further decorated by typical metal electro-plating processes, printing, painting and PVD (physical vapor deposition). These are meant as examples of decorating processes, not as a complete and exhaustive list of all possibilities.

The metal surface of the card is typically laminated to plastic films commonly used in the card industry (such as PVC and PET) to create the opposite surface. Special laminating adhesives are used to improve the bond between the metal and plastic film. This bond between the metal and plastic layers has been susceptible to delamination due to dissimilar expansion rates of the materials either because of temperature, moisture absorption electronic circuits positioned below the metal surface.

Embedded metal cards have metal embedded in the core of the card with the outer surfaces of the card being PVC or other typical card material. This card has benefits over the metal surface card because magnetic media is easily applied to conventional PVC materials, the metal piece embedded in the card can be shaped so that payment module embedding is not interfered with by the metal piece and connections can be made between very thin electronic components (such as antennae and the payment module) even though they may be opposite sides of the embedded metal piece.

The present invention is concerned with embedded metal cards and, more particularly, with manufacture of the metal core used in such cards although the manufacturing process is equally useful for metal surface cards. To help more readily understand the special features of the metal core manufactured in accordance with the present invention, traditional metal card manufacturing techniques will now be described.

Embedded metal cards, in a simple form, consist of three layers. First, there is a core of metal, typically stainless steel. An aperture is usually cut through the metal in the position of payment module contacts. Second, printed PVC rear outer layer having printing, a protective overlay and magnetic stripe. Third, a printed PVC front outer layer having printing and a protective overlay.

Particularly challenging with traditional lamination manufacturing methods is the filling of the payment module aperture or other thin apertures that may be present in the metal core to allow the metal core to be used as an antenna to enable contactless payment. The three layers are laminated together as sheets of a size large enough to make an array of cards in 3×5, 3×7, and other formats. Post lamination individual cards are separated from the sheets using specialized milling processes. Holograms and signature panels are then hot stamped onto the surface of the card using hot stamp equipment fed by magazines previously filled by the punching equipment. Cards having holograms and signature panels applied are returned to magazines for subsequent personalization processing. Cards are personalized by applying personal information such as name, account number, expiry date and security code to the magnetic stripe and the surface of the card. Magnetic media is encoded using an encoding module. Numerous methods exist for applying personal data to the surface of the card:

Most commonly name, account number and expiry date are applied by an embossing process performed by a module common to all personalization equipment manufacturers. The security code is applied by a similar indent marking module.

Laser marking is an alternate method for surface personalization.

UV curing inks are also used for surface personalization.

After personalization, cards are packaged with documents and other fulfillment materials for mailing to the customer. Printers, card adhesive stations, folders and envelop stations are common fulfillment modules on card personalization equipment.

Metal cards which process transactions via a payment module, or chip, require additional manufacturing process steps. The payment module (which includes a contact plate for interfacing payment terminals and an attached microcontroller known as a payment controller) is installed after punching and before personalization. The payment module is installed by machines that mill a pocket in the card into which the payment module is placed and usually affixed using a hot melt adhesive.

Metal cards which process transactions via contactless communications require further manufacturing steps. The three-layer construction is modified to include at least an additional core layer which has antenna wire embedded in it or alternately applied by some form of deposition. The antenna wire is then connected to terminals on the payment module. During payment module installation additional features are milled to access the antenna wire ends which are then connected to the terminals on the payment module using conductive adhesive. There is an alternate method using a coil on the backside of the payment module called coil on module.

With the foregoing specialized background in mind, the present invention will hereinafter be described. Suffice it to say, however, the manufacture of such cards, due to strict requirements imposed by well-known payment card standards, requires manufacturers to confront unique challenges applicable in the highly specialized art of manufacturing electronic payment cards.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The present invention is generally directed to processes for making an advanced metal core for use in a metal card wherein the advanced metal core contains a metal core and at least one aperture. The aperture in the metal core may house at least one component attached to the metal core such that one or more components may (or may not) extend above the generally planar surface of the metal core. The irregular surface pattern of the metal core is filled in by a polymeric material.

In order to make the advanced metal core, a two-part polymer mixture is introduced into a reservoir containing the metal core, on top of the metal core (and any electronic component(s)), in a process chamber. In an especially preferred embodiment, the two-part polymer mixture (which may be premixed or mixed as it is being introduced to the reservoir) is spread from a first end of the reservoir to a second end of the reservoir with a preselected height of the two-part polymer mixture in the reservoir over substantially all of the reservoir, and particularly preferred processes for doing this use a mechanical means to flatten the top surface of the two-part polymer mixture, one of which insures a leading edge of the two-part polymer mixture in a direction of travel of the mechanical means has a height greater than the preselected height over substantially of the travel direction of the mechanical means. Once the two-part polymer mixture is in place, a partial vacuum is created in the process chamber, and then followed by a pressurization step using inert gas in the process chamber, to reduce the volume of voids contained in the partially-cured two-part polymer mixture held in the reservoir located in the process chamber.

The metal core with the partially-cured two-part polymer mixture is then removed from the process chamber and allowed to further cure (preferably for longer than twenty-four hours) into a cured electronic core which has an upper surface. This upper surface is then treated (and removed) in a finishing process to create a new upper surface which is substantially more planar, with fewer surface irregularities, than the original top surface of the cured electronic core. It is especially preferred that the finishing process mechanically remove the original outer surface by a milling or grinding operation.

Accordingly, it is a goal of the present invention to provide processes for the manufacture of an advanced metal core for use in making metal cards, such as payment cards, having a metal core.

This and further objects and advantages will be apparent to those skilled in the art in connection with the drawings and the detailed description of the invention set forth below.

BRIEF DESCRIPTION OF THE DRAWINGS

For a fuller understanding of the invention, reference should be made to the following detailed description, taken in connection with the accompanying drawings, in which:

FIG. 3A shows a partial section of a polymer filled aperture (3A). Also shown is the front interface (4) between the metal core (1) and the molded polymer (3). Item (5) identifies the front outer surface of the polymer (3). Item (6) represents the rear outer surface of the metal core (1).

FIG. 8 illustrates curing chamber (20). The section line defines a section view shown in FIG. 8A.

DETAILED DESCRIPTION OF THE INVENTION

In accordance with the present invention processes are described for the manufacture of an advanced metal core having a metal inlay to be used as a component in the production of metal cards and, more particularly, transaction cards.

Metal inlays are assemblies containing, at a minimum, metal and a polymer. The metal inlay will be provided as an array so that multiple cards can be made from a single inlay. Other components such as antenna and other electronics can easily be incorporated into the inlay.

Molding or casting a polymer to the metal is superior to other methods in that openings in the metal can be easily filled by a polymer. Likewise, the polymer conforms to raised components that are desired within a metal card such as antennas, displays, integrated circuits and other electronic components.

Despite the many benefits of in-situ polymer curing in the manufacture of metal inlays, there are two characteristics of polymers that must be managed: gas entrainment and dimensional shrinkage. The first, gas entrainment (in the form of gas bubbles) can be caused by numerous factors, including: entrapment of atmospheric gases within the polymer during the introduction of the polymer to a molding or coating process, internal reactions of a polymer and catalyst, or unintended reactions due to moisture or other contaminants. The second characteristic, dimensional shrinkage, is common to all polymers whereby they dimensionally shrink as a fixed percentage relative to volume. Specialized manufacturing processes to produce metal inlays that take advantage of the benefits of in-situ polymer curing while minimizing defects due to gas entrainment or shrinkage will now be described.

Figure 1:
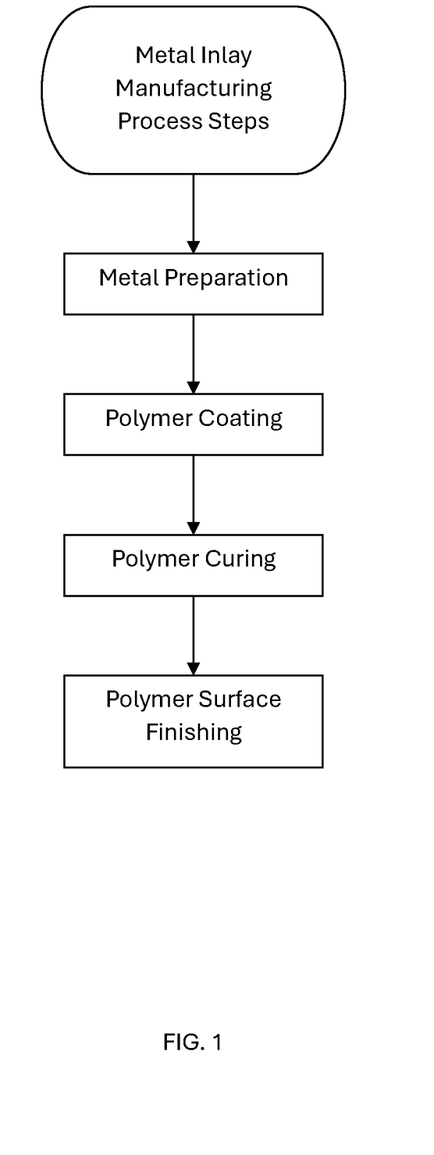
FIG. 1 is a flow diagram illustrating the general processing steps of the present invention.

The four major process used to manufacture metal inlays in accordance with the present invention are shown in the flow chart of FIG. 1, which are metal preparation, coating, curing and surface finishing.

Figure 2:
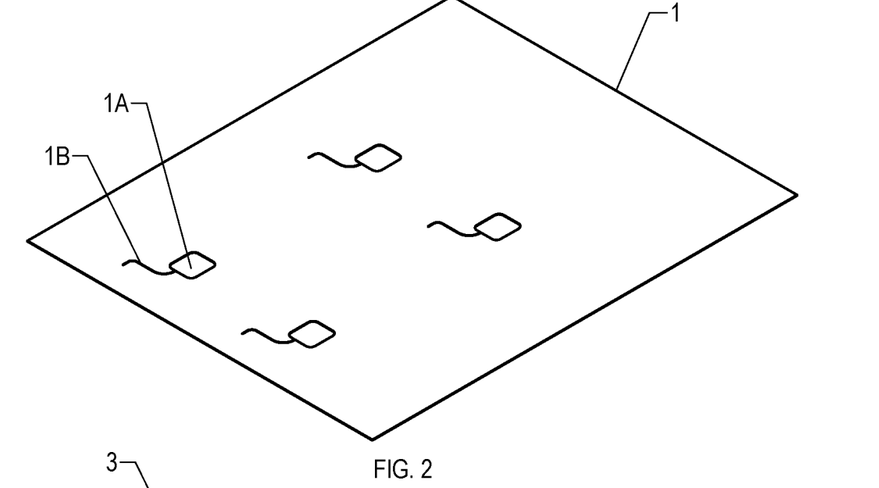
FIG. 2 illustrates a metal core (1) in a 2×2 array format having apertures (1A) for a payment module.

FIG. 2 shows a metal core (1) to be used in the manufacture of metal inlays. The metal core can be any metallic material to add weight and stiffness to a card, but corrosion resistant steels are especially preferred. It is necessary to produce apertures (1A) in the metal core (1) to provide a location for the installation of a payment chip (not shown). The metal core (1) of FIG. 2 has four apertures (1A) in a two column by two row array indicating that four cards can be made from the resulting metal inlay (2) shown in FIG. 3. The two-by-two array is shown for illustration purposes only; inlays will be offered in arrays made to conform to customers' existing manufacturing equipment, most being a three by six or larger array. Metal core (1) is typically made from sheet stock and fabricated using typical metal working processes such as milling, wire EDM, stamping, chemical etching or laser cutting. Metal core (1) could also be manufactured using additive processes such as casting, sintering or 3D printing.

Figure 3:
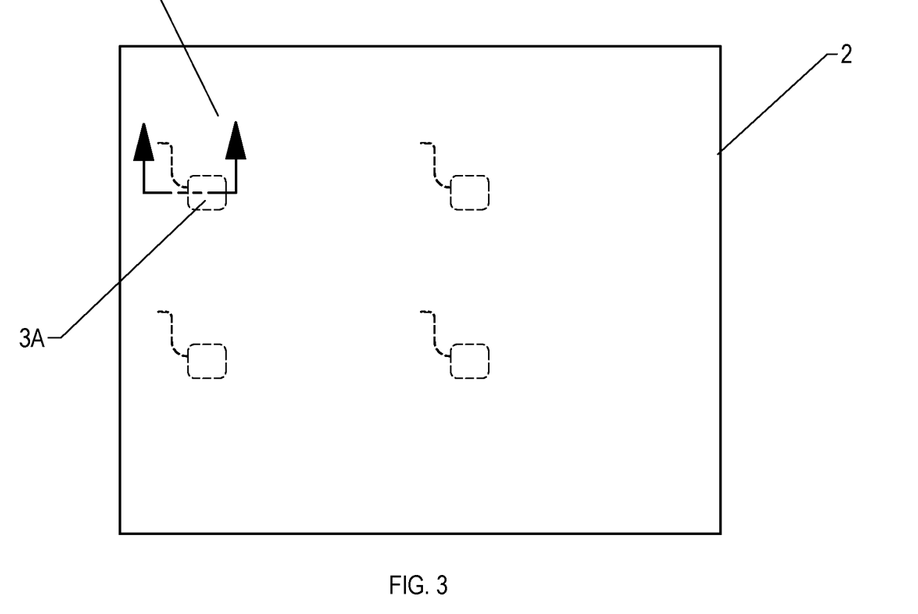
FIG. 3 illustrates a front view of a molded inlay (2) showing the molded polymer (3) and the polymer filled apertures (3A). The section line in FIG. 3 defines the partial section view shown in FIG. 3A.
Figure 3A:
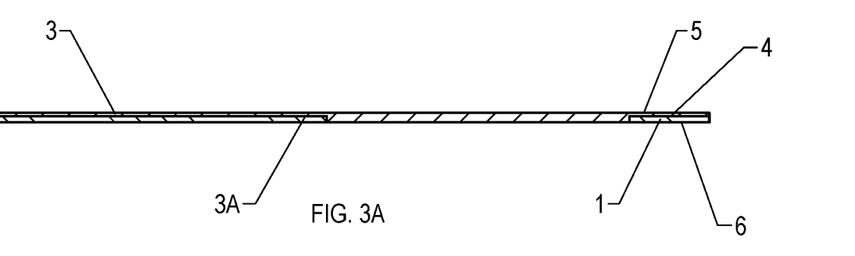

The basic components of a metal inlay are shown in FIGS. 3 and 3A and are described here to aid in understanding the description of the manufacturing methods and the required manufacturing processes to be described. A simple metal inlay (2) that has been processed using the steps shown in the flow chart of FIG. 1 is shown in FIGS. 3 and 3A. The front of the metal core (1) has been coated with a polymer (3). The apertures (1A) and (1B) have likewise been filled with polymer (3A) during the coating operation. The top surface (4) of the metal core (1) is the interface between the metal core (1) and the polymer (3) and may be modified to promote adhesion of the polymer. Such modification can be mechanical, chemical or by coating or laminating an interface material that readily adheres to the metal (1) and the polymer (3). Likewise, the outer surface (5) of the polymer (3) may be modified to improve the lamination strength of customer installed outer layers (not shown). The outer surface (5) modification may be mechanical or by the coating or lamination of thermal adhesives. Variations of this simple metal inlay may include the addition of electronic components (not shown) within the polymer (3). Electronic components could include antenna, displays, batteries and ICs. Additionally, both sides of the metal core (1) may be coated with polymer (3), which is done by performing the processes which will now be described for coating one side and then, essentially, repeating the same process for coating the other side.

In the present invention, polymer casting will take place when a two-part polymer (which may be polyurethane, epoxy or polyester, or other suitable polymer) is introduced on top of metal core (1). The two-part polymer may be premixed before its introduction, or mixed at the point of introduction, depending upon process design considerations, but once mixed, the two parts will begin to react and cure. As the two-part polymer begins to cure, it becomes more viscous, which creates certain challenges in its mixing and application on top of metal core (1).

Applying a controlled thickness of polymer (3) to a metal core (1) requires specialized equipment. An especially preferred embodiment, which is meant to be merely illustrative, but not limiting, will now be described.

A protective film (16) is positioned on top of vacuum assembly (11), aligned by alignment pins (15), and then casting fluid retaining dam (8) and metal core (1) are located on top of temporary adhesive (16A) of protective film (16) which will function as a protective mask (9A) when a partial vacuum is created by pulling gas out of vacuum port (12A). It is especially desirable that metal core (1) be configured snugly inside of retaining dam (8), that vacuum plate (13) be roughly the same size as frame (9) and that vacuum plate (13) be made of porous aluminum so that gas may permeate vacuum plate (13). The partial vacuum created by pulling gas out of vacuum port (12A) should remain throughout the casting process to keep protective mask (9A) flat against vacuum plate (13). Two-part polymer is introduced, for example, by pouring or via low pressure spray, on top of metal core (1) while doctor blade assembly (17) is used to push a bead of fluid from one side of casting fluid retaining dam (8) to its opposite side while fluid retaining dam 8 is held in vacuum plate assembly (11). The amount of fluid being pushed is critical because it should be sufficient so that air bubbles or voids are not introduced; in other words, there should be excess fluid so as to avoid starving doctor blade (19), but the amount of fluid should decrease as the doctor blade (19) reaches its opposite side (near the end of the spreading operation) so very little fluid (or, optimally, no fluid) flows over frame (9).

Figure 4:
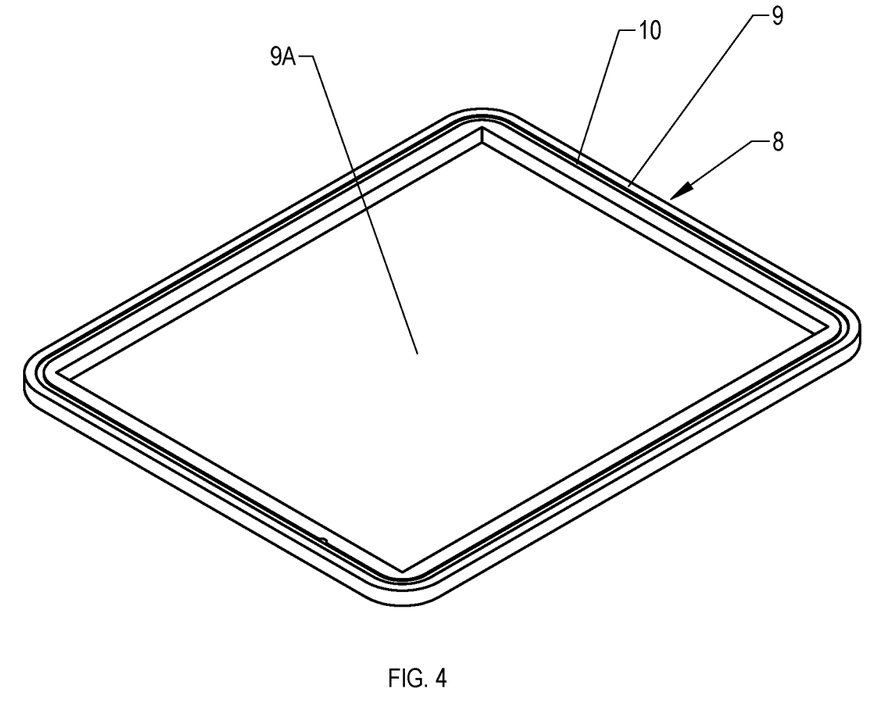
FIG. 4 illustrates a casting fluid retaining dam (8) having a frame (9) containing an O-ring (10) in accordance with the present invention.
Figure 5:
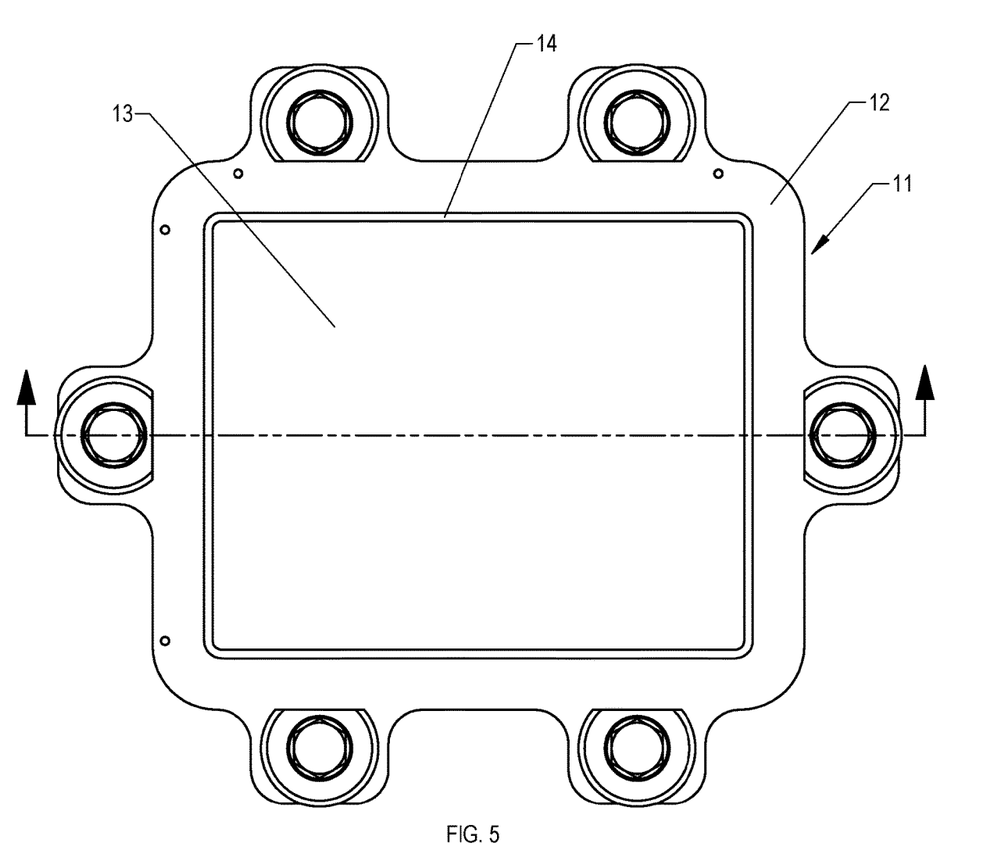
FIG. 5 illustrates a top view of a vacuum plate assembly (11) having plate assembly base (12), vacuum plate (13) and sealant barrier (14) (e.g., epoxy) used to hold components during the casting and curing of inlays.
Figure 5A:
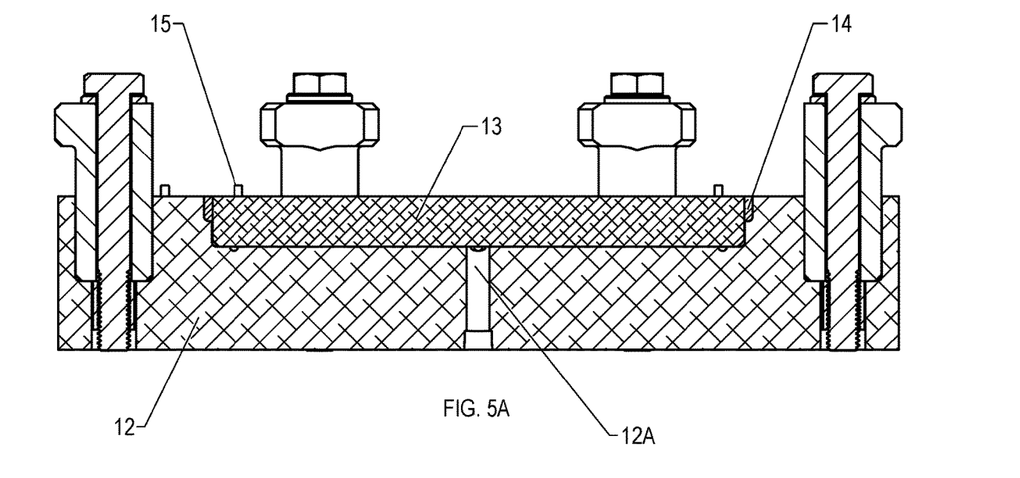
FIG. 5A is a section view along the section line in FIG. (5) illustrating alignment pins (15) and vacuum port (12A).
Figure 6:
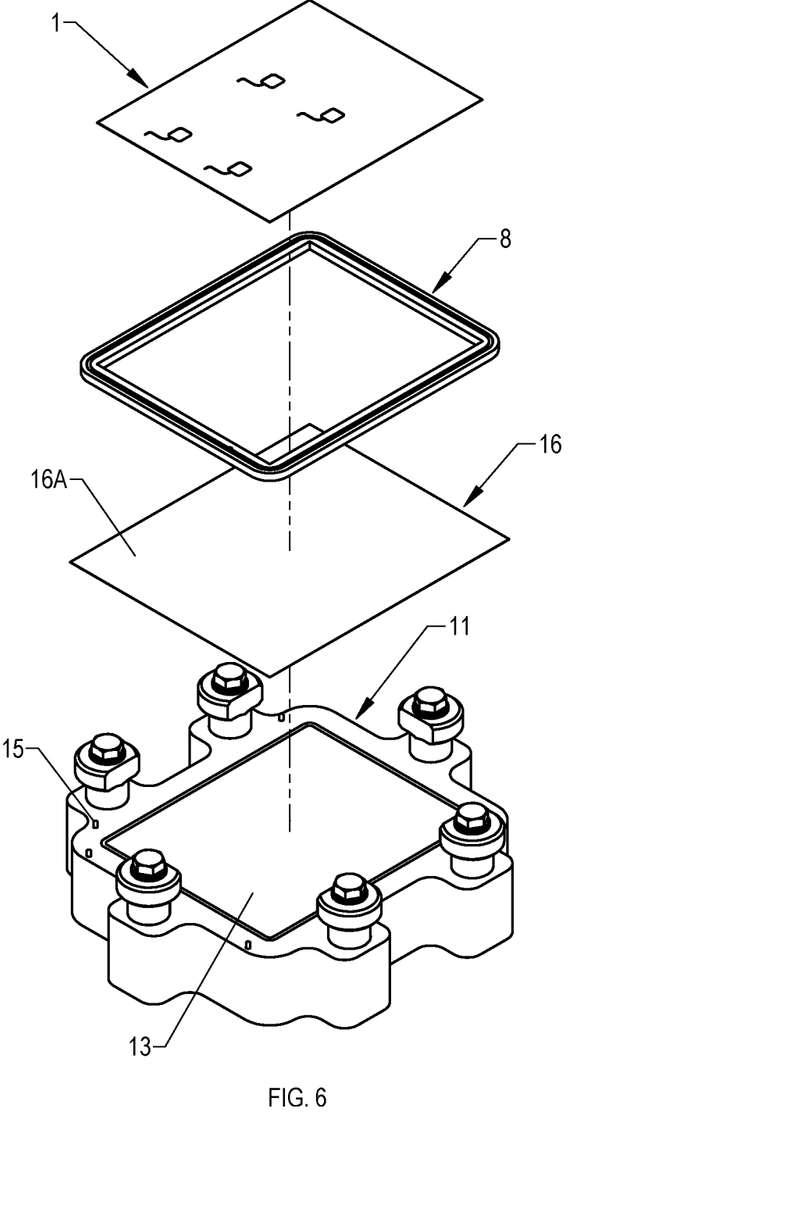
FIG. 6 is an exploded view which illustrates the orientation of components relative to vacuum plate assembly (11) in preparation for casing. Shown in FIG. 6 are a protective film (16) having a temporary adhesive (16A) on one side and the casting fluid retaining dam (8) as well as metal core (1).
Figure 7:
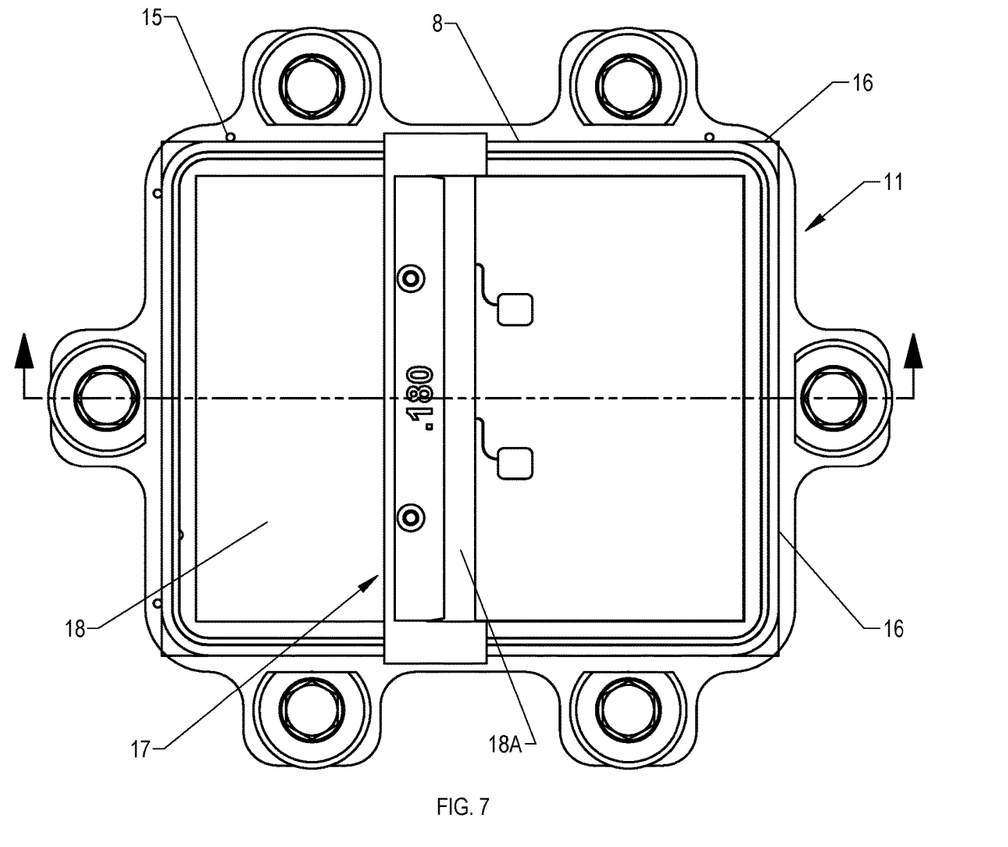
FIG. 7 is a top view of vacuum assembly (11) with protective film (16), casting fluid retaining dam (8) positioned against alignment pins (15). Also shown is a doctor blade assembly (17) positioned partially through a coating operation, with its direction of travel indicated by a travel arrow. Item (18) is the coated polymer with (18A) representing a polymer reservoir being spread in a spreading operation by doctor blade assembly (17). The section line defines a section view shown in FIG. 7A.
Figure 7A:
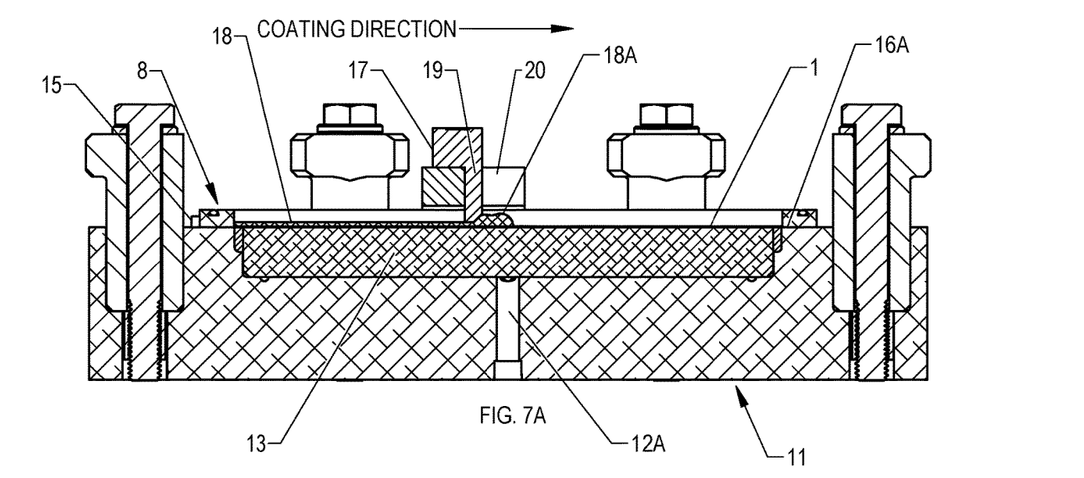
FIG. 7A illustrates doctor blade assembly (17) is positioned partially through a spreading operating whereby the coating is being spread from left to right. Coated polymer (18) is shown to the left of doctor blade (19) while uncoated polymer (18A) is shown piled up to the right of doctor blade (19).
Figure 8:
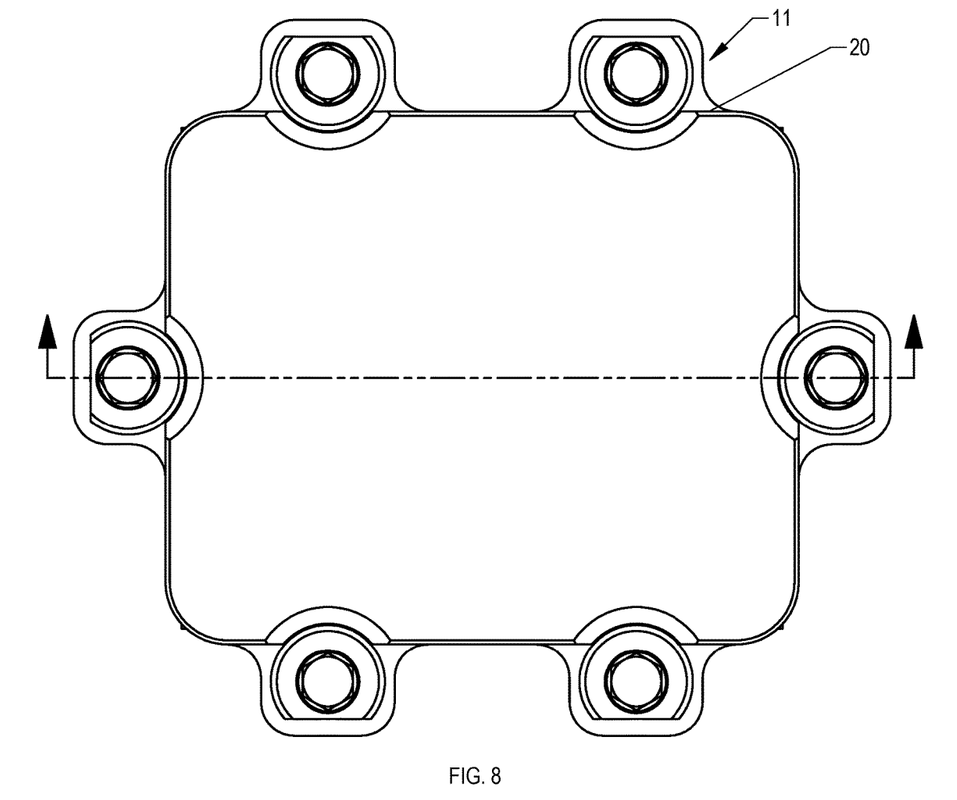
Figure 8A:
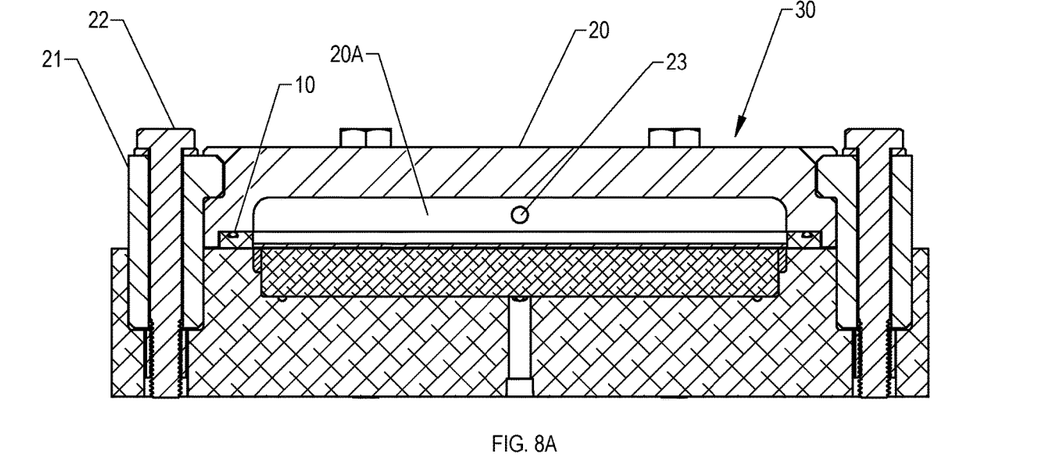
FIG. 8A also illustrates clamp (21), screw (22), cavity (20A) (for flooding with inert gas) and port (23) (for creating a vacuum).
Figure 9:
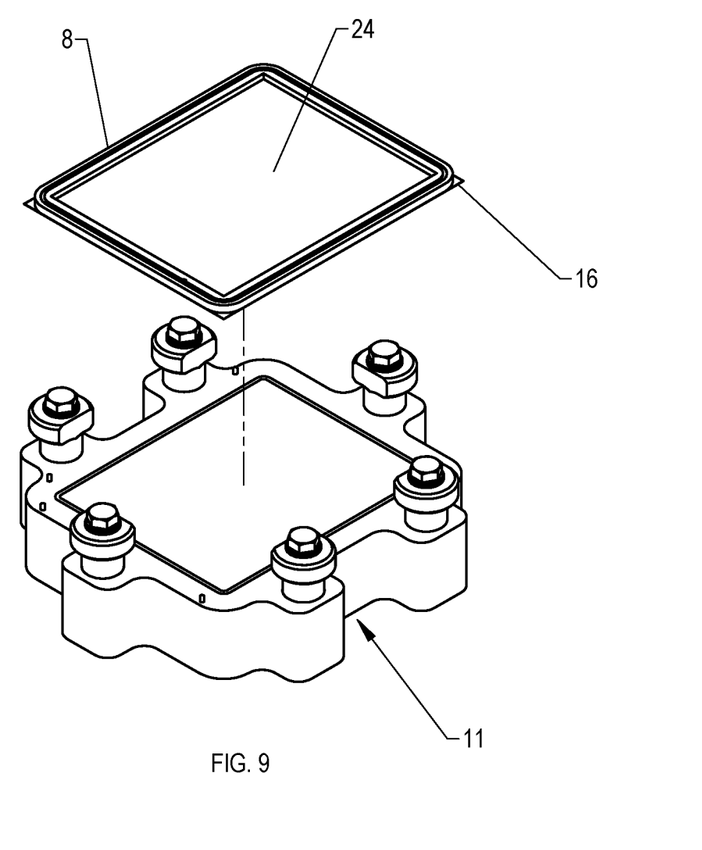
FIG. 9 is a partially exploded view which illustrates protective coating (16) and its placement relative to casting fluid retaining dam (8) and curing chamber (20).

Once a controlled thickness of polymer is applied to the metal core, curing chamber (30) is closed and sealed. Such sealing can be accomplished, by way of example only, through use of clamps (21) and screws (22), which apply pressure downwardly on lid (20). As curing chamber (30) is sealed, O-ring (10) is flattened, and the two-part polymer, which is beginning its curing process, has nowhere to leak out. A partial vacuum is then created inside of cavity (20A) in curing chamber by pulling air out of cavity (20A) through vacuum port (23). The partial vacuum created inside of cavity (20A) should be greater than the partial vacuum created by pulling gas out of vacuum port (12A) and it is used to reduce the amount of bubbles in the curing two-part polymer. Next, the partial vacuum is ceased and cavity (20A) is pressurized with inert gas (which contains no moisture and will not react with the curing two-part polymer) to reduce the volume of voids contained in what is now a partially-cured two-part polymer mixture applied on top of metal core (1). Some embodiments use ultra-dry gas/air (e.g., gas/air with a relative humidity equal to or less than 30%) as an alternative to the inert gas.

Figure 10:
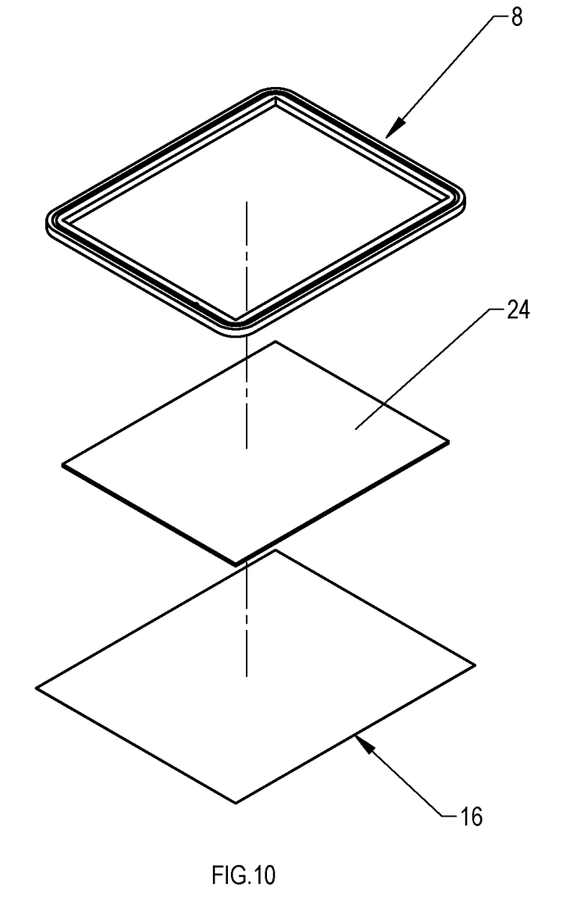
FIG. 10 illustrates dam (8) with a metal core and partially cured two-part polymer (24) after it has been removed from curing chamber (20). Additionally, the removal of the protective film (16) is shown.

After the two-part polymer mixture is partially cured in curing chamber (30), lid (20) is removed from curing chamber (30) and the partially-cured two-part polymer, still held inside of dam (8), is removed from curing chamber (20) and allowed to continue curing for at least 24 hours, and maybe for up to a week, so that the curing is essentially complete, meaning that there will be essentially no more noticeable shrinkage of the two-part polymer mixture caused by any further curing. This is important because the final processing step is to reduce the effect of shrinkage by a final finishing processing step in which an upper surface of the cured two-part polymer is treated to reduce surface irregularities. This final finishing process step may be any suitable process, examples of which include milling, grinding, sanding, etching, or planing.

Figure 12:
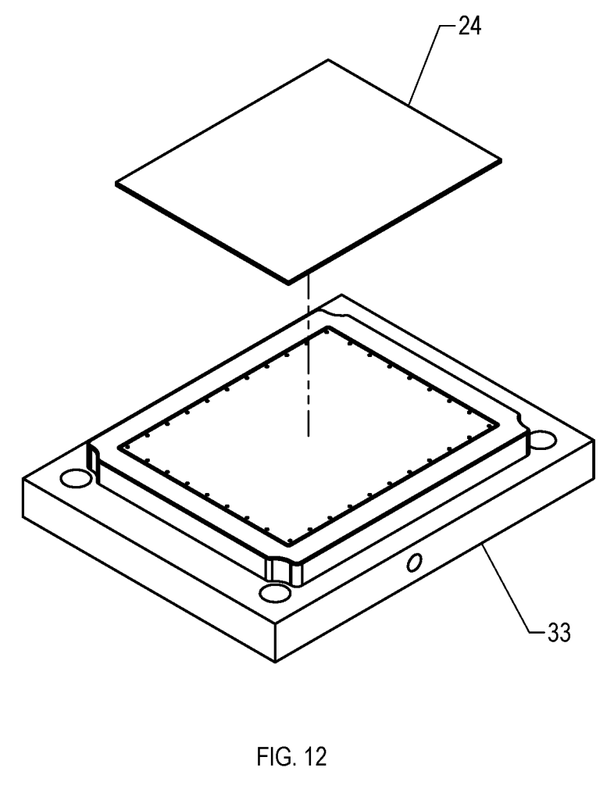
FIG. 12 illustrates the metal core and a fully cured two-part polymer (26) being loaded onto a vacuum holding fixture (33) which is mounted in a finishing machine (not shown).

In order to promote efficiency of operation, it has been found to be especially preferred, once fluid retaining dam (8) is removed from curing chamber (20), to allow the two-part polymer mixture to continue to cure for several hours (e.g., three hours) while it is still within fluid retaining dam (8). Thereafter, the partially cured two-part polymer and metal core can be removed from fluid retaining dam (8) and allowed to continue curing in storage. Next, the now fully-cured two-part polymer and metal core are loaded into a mechanical delivery means for the final finishing processing step, an especially preferred example of which is to place them in a vacuum fixture (33) which is then used in the finishing process.

Figure 11:
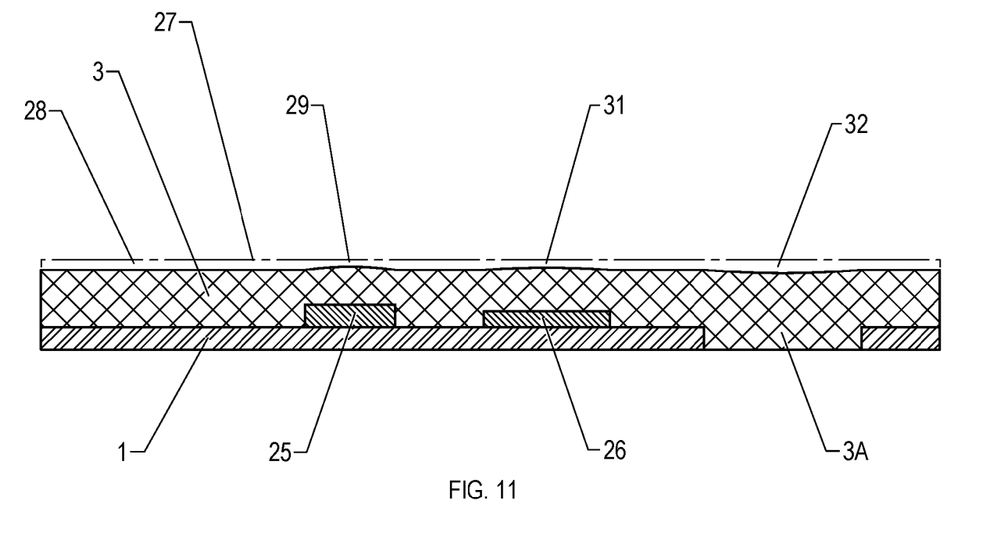
FIG. 11 illustrates the effects of shrinkage on an ideal coating level (pre-shrinkage) (26) over a metal core. Line (27) represents an actual shrunk coating level, with coating areas (28) and (29) over raised areas (24) and (25) being slightly higher whereas coating area 30 over aperture (3A) is slightly lower, thus illustrating that depth of coating matters because shrinkage occurs at a constant percentage, which means different depths of coating will shrink different amounts.
Figure 13:
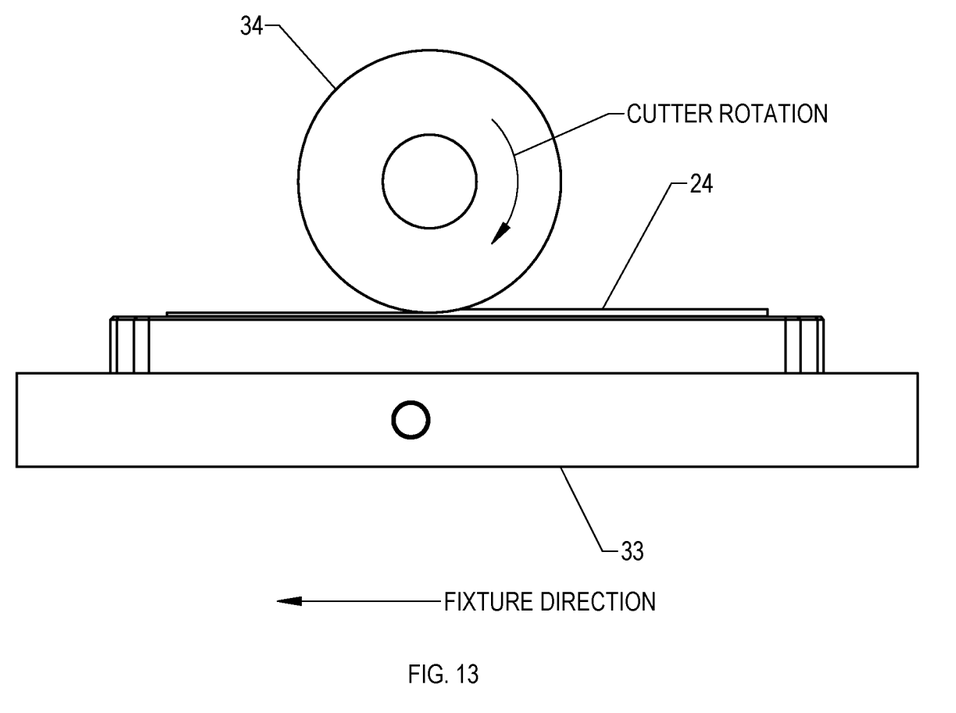
FIG. 13 shows the metal core and a fully cured two-part polymer (26) in a partially completed finishing process. A direction line indicated the motion of the vacuum fixture (33) relative to cutter (34) which could be a milling cutter, grinding wheel or other finishing device.

It has also been found that it is desirable to perform an intermediate finishing process step once the partially cured two-part polymer and metal core can be removed from fluid retaining dam (8). This intermediate finishing process step is essentially the same as the final processing step except that it removes a skin layer from the partially cured two-part polymer which then continues to cure. The amount of skin layer removed should be sufficient so that, once the skin layer is removed, the upper surface of the still curing polymer will be essentially flat (although it will subsequently continue to cure, thus introducing new surface irregularities). It has been found that removal of this skin layer unexpectedly reduces the amount of time necessary to get to the fully-cured two-part polymer and metal core which are then treated by the final processing step. Also, if another layer of two-part polymer is to be applied to the opposite side of the metal core, such processing can now begin, before the polymeric layer on its first side is fully cured, and the now essentially flat still curing first side of the metal core will remain flat when it is placed in a casting fluid retaining dam (8) on top of a second protective film (16) and the polymer casting process is then repeated for the second side (although the intermediate finishing process step might be omitted). In such a scenario, when it comes time to perform the final finishing process step, such step can be performed on both sides of the metal core.

It is worth noting that an advanced metal core made in accordance with the teachings set forth herein can achieve a gloss finish which is not possible with traditional reaction injection molding (RIM) processes. Also, this is possible even if structures are built up on the metal core, such as ferrite for use with an antennae, and such a finish can be obtained on both sides of the advanced metal core.

Although the foregoing detailed description is illustrative of preferred embodiments of the present invention, it is to be understood that additional embodiments thereof will be obvious to those skilled in the art. Further modifications are also possible in alternative embodiments without departing from the inventive concept.

Accordingly, it will be readily apparent to those skilled in the art that still further changes and modifications in the actual concepts described herein can readily be made without departing from the spirit and scope of the disclosed inventions.

What is claimed is:

1. A process for making a metal core for a metal card, comprising the steps of:
   introducing a two-part polymer mixture on the metal core in a process chamber;
   exposing the metal core and two-part polymer mixture to at least a partial vacuum followed by introducing a pressurized gas into a pressurized chamber, wherein the pressurized gas is non-reactive with the two-part polymer mixture;
   removing the metal core with a partially-cured two-part polymer mixture from the process chamber; and
   allowing the metal core with the partially-cured two-part polymer mixture to cure outside of the process chamber to form a cured metal core.

2. The process of claim 1, wherein the metal core includes at least one aperture located in a generally planar first surface area of the metal core and at least one electronic component located in the at least one aperture.

3. The process of claim 2, wherein the at least one electronic component extends above the generally planar surface area of the metal core.

4. The process of claim 2, wherein at least one component is located on the generally planar surface of the metal core.

5. The process of claim 1, wherein the metal core is allowed to cure for at least twenty-four hours before an upper surface of the metal core is treated to reduce an amount of surface irregularities.

6. The process of claim 1, further including treating an upper surface of the cured metal core with a finishing means that removes the upper surface and creates a second upper surface which is more substantially planar than the upper surface.

7. The process of claim 6, wherein the finishing means is comprised of a process which mechanically removes the upper surface.

8. The process of claim 7, wherein the finishing means is comprised of a milling operation.

9. The process of claim 7, wherein the finishing means is comprised of an etching operation.

10. The process of claim 7, wherein the finishing means is comprised of a sanding operation.

11. The process of claim 7, wherein the finishing means is comprised of a grinding operation.

12. The process of claim 7, wherein the finishing means is comprised of a planing operation.

13. The process of claim 1, further including treating an intermediary upper surface of the metal core with the partially-cured two-part polymer mixture to create an essentially flat intermediary upper surface of the metal core with the partially-cured two-part polymer mixture before the cured metal core is formed.

14. The process of claim 13, wherein the intermediary upper surface of the metal core with the partially-cured two-part polymer mixture after it has been fully cured is an upper surface of the cured metal core.

15. The process of claim 13, comprising the further steps of:

locating the metal core in the reservoir in the process chamber, wherein the metal core comprises a generally planar second surface area;

introducing a second two-part polymer mixture into the reservoir on top of the second surface of the metal core;

reducing a volume of voids contained in a partially-cured second two-part polymer mixture held in the reservoir located in the process chamber by creating a partial vacuum in the process chamber followed by introducing a pressurized gas into the pressurized chamber, wherein the pressurized gas is non-reactive with the two-polymer mixture;

removing the metal core with the partially-cured second two-part polymer mixture from the process chamber;

allowing the metal core with the partially-cured second two-part polymer mixture to cure outside of the process chamber to form a metal core with two cured surfaces; and treating an upper surface on top of the second surface area of the metal core with two cured surfaces to reduce the amount of surface irregularities which are located in a second upper plane of a second upper surface.

16. The process of claim 1, wherein the two-part polymer mixture is mixed together before it is introduced into the reservoir onto the metal core.

17. The process of claim 1, wherein the two-part polymer mixture is mixed together as it is introduced into the reservoir onto the metal core.

18. The process of claim 1, comprising the further step of feeding the two-part polymer mixture into the reservoir in a spreading step in which the two-part polymer mixture is spread from a first end of the reservoir to a second end of the reservoir with a preselected height of the two-part polymer mixture in the reservoir over substantially all of the reservoir.

19. The process of claim 18, wherein a mechanical means is used to flatten a top surface of the two-part polymer mixtures.

20. The process of claim 19, wherein a leading edge of the two-part polymer mixture in a direction of travel of the mechanical means has a height greater than the preselected height over substantially all of said direction of travel.

21. The process of claim 1, wherein the reservoir is created by affixing a protective film to a casting fluid retaining dam.

* * * * *